United States Patent
Cabrera

(10) Patent No.: US 9,414,178 B2
(45) Date of Patent: Aug. 9, 2016

(54) INTER-CARRIER DIFFERENTIATION USING ALLOCATION AND RETENTION PRIORITY IN A WIRELESS COMMUNICATION SYSTEM

(75) Inventor: Ricardo Paredes Cabrera, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 36 days.

(21) Appl. No.: 13/473,051

(22) Filed: May 16, 2012

(65) Prior Publication Data

US 2013/0310056 A1 Nov. 21, 2013

(51) Int. Cl.
*H04W 4/00* (2009.01)
*H04W 8/18* (2009.01)
*H04W 72/10* (2009.01)

(52) U.S. Cl.
CPC ........ *H04W 4/00* (2013.01); *H04W 8/18* (2013.01); *H04W 72/10* (2013.01)

(58) Field of Classification Search
CPC ..... H04W 28/16; H04W 28/18; H04W 28/20; H04W 28/22; H04W 28/24; H04W 28/26; H04W 72/04; H04L 12/5695; H04L 47/805; H04L 47/76
USPC ........ 455/432.1, 450, 451, 452.1, 452.2, 453, 455/455, 464; 370/395.4, 395.41
See application file for complete search history.

(56) References Cited

U.S. PATENT DOCUMENTS

| | | | |
|---|---|---|---|
| 5,940,763 A * | 8/1999 | Alperovich et al. | 455/450 |
| 2002/0110106 A1 * | 8/2002 | Koo et al. | 455/450 |
| 2004/0176075 A1 * | 9/2004 | Schwarz et al. | 455/414.1 |
| 2005/0185655 A1 | 8/2005 | Blanc et al. | |
| 2008/0013470 A1 * | 1/2008 | Kopplin | 370/310 |
| 2009/0154413 A1 * | 6/2009 | Kim | H04W 28/16 370/329 |
| 2009/0154415 A1 * | 6/2009 | Park | H04W 72/10 370/329 |
| 2010/0217855 A1 * | 8/2010 | Przybysz et al. | 709/223 |

(Continued)

FOREIGN PATENT DOCUMENTS

| | | |
|---|---|---|
| EP | 1 250 021 A1 | 10/2002 |
| EP | 1 619 917 A1 | 1/2006 |
| WO | 2012000564 A1 | 1/2012 |

OTHER PUBLICATIONS

3GPP TS 23.203 V11.5.0 (Mar. 2012), "3rd Generation Partnership Project; Technical Specification Group Services and System Aspects; Policy and Charging Control Architecture (Release 11)" consisting of 175 pages.

(Continued)

*Primary Examiner* — Thai Vu
(74) *Attorney, Agent, or Firm* — Christopher & Weisberg, P.A.

(57) ABSTRACT

A method and system for allocating services to a first subscriber of a first home service provider when the first subscriber is visiting a network associated with a visited service provider. A node of the visited network receives a request from the visiting first subscriber to receive a first service from the visited network. In response to the request, the visited network determines whether there are sufficient available resources of a first set of resources to provide the requested first service. When the available resources are insufficient to provide the requested service, then at least one pre-existing service supported by the first set of resources is preempted so that sufficient resources from the first set of resources are made available to provide the requested service, and the requested service is provided to the visiting first subscriber.

13 Claims, 4 Drawing Sheets

(56) References Cited

U.S. PATENT DOCUMENTS

| | | | | |
|---|---|---|---|---|
| 2011/0149875 | A1* | 6/2011 | Ahuja | H04L 47/72 370/329 |
| 2011/0158184 | A1* | 6/2011 | Agulnik | H04W 28/18 370/329 |
| 2011/0305137 | A1* | 12/2011 | Chu et al. | 370/230 |
| 2012/0028626 | A1* | 2/2012 | Marocchi | H04L 63/104 455/422.1 |
| 2012/0034916 | A1* | 2/2012 | Hu et al. | 455/432.1 |
| 2013/0086258 | A1* | 4/2013 | Kalgi et al. | 709/224 |

OTHER PUBLICATIONS

3GPP TS 23.401 V11.1.0 (Mar. 2012), "3rd Generation Partnership Project; Technical Specification Group Services and System Aspects; General Packet Radio Service (GPRS) Enhancements for Evolved Universal Terrestrial Radio Access Network (E-UTRAN) Access (Release 11)" consisting of 284 pages.

3GPP TS 23.401 V8.16.0 (Release 8), "LTE: General Packet Radio Service (GPRS) Enhancements for Evolved Universal Terrestrial Radio Access Network (E-UTRAN) Access", Technical Specification, European Telecommunications Standards Institute (ETSI), 650, Route des Lucioles; F-06921 Sophia-Antipolis; France, XP014069852, pre-emption using ARP; p. 39, paragraph 4.7.3 dated Mar. 1, 2012 consisting of 240 pages.

3GPP TS 25.413 V10.5.0 (Release 10), "Universal Mobile Telecommunications System (UMTS); UTRAN Iu Interface Radio Access Network Application Part (RANAP) Signalling" Technical Specification, European Telecommunications Standards Institute (ETSI), 650, Route des Lucioles; F-06921 Sophia-Antipolis; France, XP014069919, p. 29, paragraph 8.2.2 ARP: pre-emption capability; pre-emption vulnerability; p. 164, paragraph 9.2.1.3 dated Mar. 1, 2012 consisting of 418 pages.

International Search Report and Written Opinion dated Oct. 2, 2013 for International Application No: PCT/IB2013/053207, International Filing Date: Apr. 23, 2013 consisting of 12-pages.

Written Opinion of the International Preliminary Examining Authority dated Jul. 28, 2014 for International Application Serial No. PCT/IB2013/053207, International Filing Date: Apr. 23, 2013 consisting of 7-pages.

PCT Notification Concerning Transmittal of International Preliminary Report on Patentability, Form PCT/IPEA/416, dated Aug. 27, 2014 for corresponding International Application No. PCT/IB2013/053207; International Filing Date: Apr. 23, 2013 consisting of 20-pages.

Communication pursuant to Article 94(3) EPC—1st EP Examination Report dated Dec. 17, 2015 for EP Regional Stage Application No. 13 728 833.8-1857, Entry into EP Regional Phase filing date—Oct. 30, 2014 consisting of 4-pages.

\* cited by examiner

INTER-CARRIER DIFFERENTIATION USING ALLOCATION AND RETENTION PRIORITY IN A WIRELESS COMMUNICATION SYSTEM

TECHNICAL FIELD

Wireless communications, and in particular to a method and system for controlling provision of services to a visiting subscriber in a wireless communication network.

BACKGROUND

An issue for service providers in a communication network is how a service provider of a visited network is to treat a customer of another service provider when the customer roams into the visited network. One possibility is for the service provider of the visited network to treat visiting subscribers the same as subscribers of the service provider of the visited network. Thus, both visiting and home subscribers could share the same quality of service and types of service provided by the provider of the visited network. This approach may be unsatisfactory since there may be constraints on the services and quality of service that can be provided to both visiting and home subscribers. On the other hand, a service provider of a visited network may desire to offer different qualities of service to visiting subscribers and home subscribers, pursuant to, for example, a service level agreement (SLA) between the service provider of the visited network and a service provider of the home network of the visiting subscribers. However, current Long Term Evolution (LTE) standards do not specify a method to provide inter-carrier differentiation to allocate or preempt services provided to visiting and home subscribers.

SUMMARY

Methods and systems for allocating services to a first subscriber of a first home service provider when the first subscriber is visiting a network associated with a visited service provider are provided. A node of the visited network receives a request from the visiting first subscriber to receive a first service from the visited network. In response to the request, the visited network determines whether there are sufficient available resources of a first set of resources to provide the requested first service. When the available resources are insufficient to provide the requested service, then at least one pre-existing service supported by the first set of resources is preempted so that sufficient resources from the first set of resources are made available to provide the requested service, and the requested service is provided to the visiting first subscriber.

According to another aspect, a wireless communication system having a memory and a processor is provided. The memory stores rules for allocating resources to subscribers and preempting services to subscribers within the wireless communication system. The processor is configured to allocate a first service to a first one of a first set of subscribers based on available resources and according to the stored rules. The processor preempts at least one pre-existing service according to the stored rules for at least one of a second set of subscribers so that enough resources are made available to provide the first service to the first one of the first set of subscribers.

According to yet another aspect, a method of differentiating between subscribers of different vendors in a wireless communication network of a first vendor that is visited by a subscriber of a second vendor is provided. A node of the first vendor determines whether sufficient resources of a first set of resources are available to provide a first service to a visiting subscriber of the second vendor. When insufficient resources of the first set of resources are available, a pre-existing service supported by a second set of resources is preempted so that enough resources are made available to support the first service, and the first service is then provided to the visiting subscriber.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
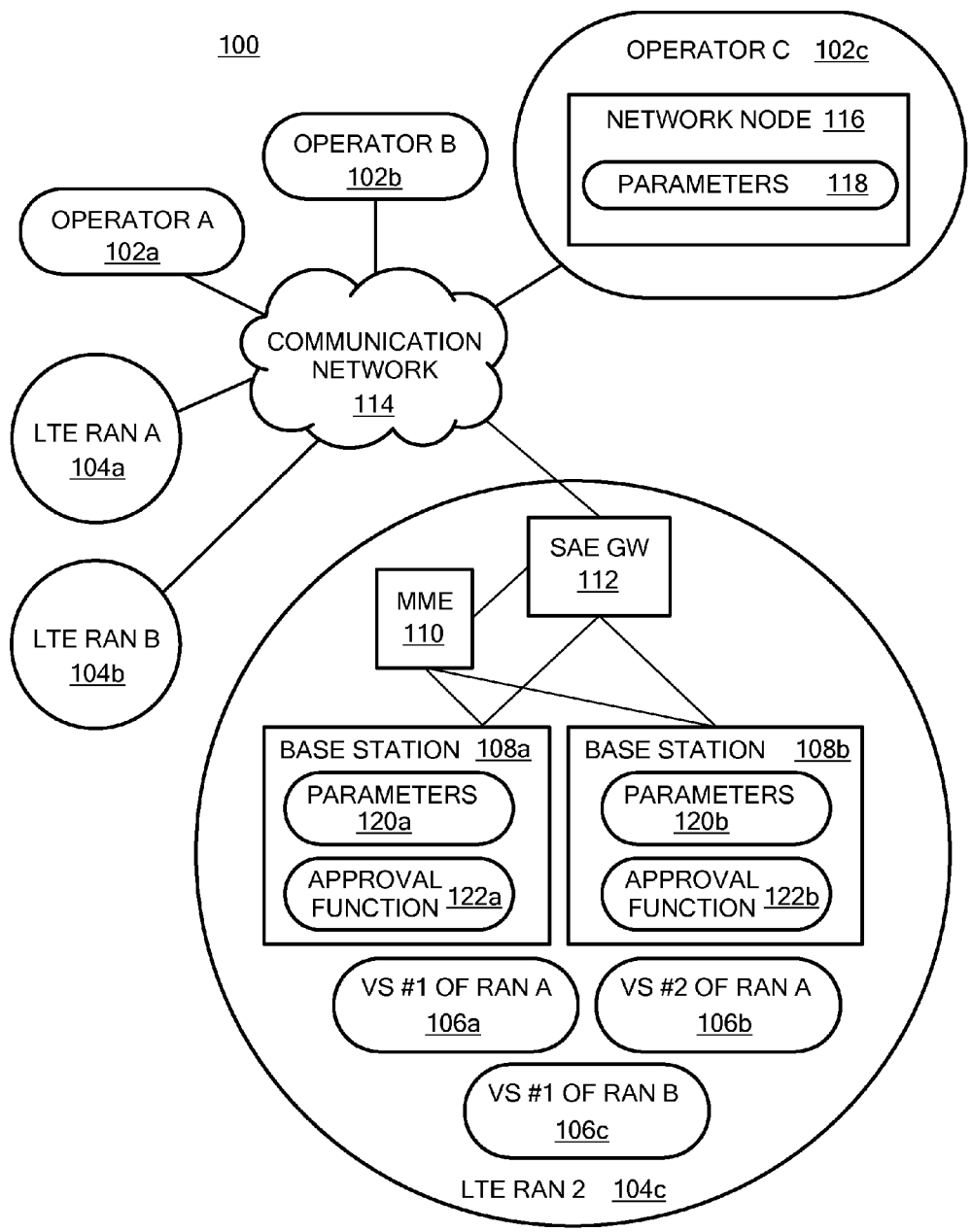
FIG. 1 is a block diagram of an exemplary communication system constructed in accordance with principles of the present invention.

Before describing in detail exemplary embodiments that are in accordance with the present invention, it is noted that the embodiments reside primarily in combinations of apparatus components and processing steps related to controlling the provision of services to a visiting subscriber by a visited network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In embodiments described herein, a service level agreement (SLA) between a home network service provider of a visiting subscriber and a visited network may be executed and in effect. In this case, the visited network service provider may decide, based on one or more terms of the SLA, whether to admit and allocate resources to a visiting subscriber. The decision may be based on an Allocation and Retention Priority (ARP) assigned to a vendor and services identified as preemption-vulnerable.

Referring now to the drawing figures, in which like reference designators denote like elements, there is shown in FIG. 1 an exemplary communication network 100 having first, second and third operators 102a, 102b and 102c. These operators may be referred to herein collectively as operators or service providers or vendors 102. Each service provider 102 operates a radio access network (RAN) 104a, 104b and 104c, referred to herein collectively as radio access networks 104. Although one RAN 104 for each service provider 102 is shown, a service provider may operate more than one RAN 104. A RAN 104 may be, for example, a Long Term Evolution (LTE) RAN.

In FIG. 1, RAN 104c is visited by one or more visiting subscribers 106. For example, visiting subscribers 106a and 106b are registered with home RAN 104a, and visiting subscriber 106c is registered with RAN 104b. More or fewer visiting subscribers may be visiting RAN 104c at any particular time. As used herein, it is understood that the term "visiting subscriber" such as visiting subscriber 106 refers to the user equipment (UE) of a visiting customer. As used herein, the home network 104a or 104b refers to the network where the visiting subscriber is registered, e.g., obtains general monthly service, and the visited network 104c is a network that a subscriber visits but with which the subscriber is not registered.

In one embodiment, a home network 104a or 104b and visited network 104c are wireless communication LTE networks. However, the invention is not limited to such. It is contemplated that the home network 104a and/or 104b, and visited network 104c can be based on any suitable wireless communication network standard that can support and implement the functions described herein, for example, networks based on 3rd Generation Partnership Project (3GPP) technologies and standards.

Each RAN 104 may have a plurality of evolved nodes B (eNODE B) referred to herein as base stations 108, such as base stations 108a and 108b. It is understood that the invention is not limited to LTE eNODE B base stations, and that other base station technologies may be used. When a visiting subscriber 106 is near a base station 108a or 108b, the visiting subscriber 106 may seek to establish a connection with the base station 108a or 108b. The base stations 108 communicate with a respective mobile management entity (MME) 110, which in turn communicates with a respective system architecture evolution (SAE) gateway (GW) 112. In turn, the SAE GW 112 communicates with the operator 102c via a communication network 114, such as the Internet. Note that the configurations of the radio access networks 104 shown in FIG. 1 are exemplary. Different quantities of the elements of these networks may be employed than are shown, and their connectivity may be different from that shown. For example, a RAN may include more or less than two eNODE B elements, and more or less than one MME and/or SAE GW. In some embodiments, the eNODE B elements may be connected only to the MME and not directly to the SAE GW.

The operator 102c may include a network node 116 having parameters 118 that determine under what conditions services are to be provided to a visiting subscriber 106. The network node 116 may be, for example, a home subscriber server (HSS), a policy and charging rules function (PCRF) device, an authentication, authorization and accounting (AAA) device or an Internet Protocol (IP) multimedia subsystem (IMS). The parameters 118 may also be stored in each base station 108 and included in parameters 120a and 120b of base stations 108a and 108b respectively. Further, each base station 108a and 108b may have installed an approval function 122a and 122b, respectively.

When a visiting subscriber 106 comes in the neighborhood, i.e., within range, of a base station 108 of the radio access network 104c and communication between the base station 108 and the visiting subscriber 106 is established, the base station 108 may, via the MME 110, the SAE GW 112 and the communication network 114, notify the service provider 102c of the presence of the visiting subscriber 106 in the visited network 104c. The parameters 116 and/or the parameters 120a and 120b, may specify preemption vulnerable services. A preemption vulnerable service is a service provided to a first subscriber that may be preempted in favor of a service to be provided to second subscriber.

In one scenario, a visiting subscriber 106 enters the visited network 104c and sends a request to the base station 108a of the RAN 104c for one or more services. Each base station 108a and 108b, has an approval function 122a and 122b, respectively, referred to collectively as approval functions 122. Upon receipt of the request, the service approval function 122 determines, based on parameters 120a, whether to admit the subscriber 106, and/or approve the service or services requested by the visiting subscriber 106. In another scenario, the visiting subscriber 106 is already admitted to the visited network 104c and is now requesting a new service. Upon receipt of the new request, the service approval function 122a determines, based parameters 120a, whether to approve the new service requested by the visiting subscriber 106. In yet another scenario, the visiting subscriber 106 may be powered down initially, and then awaken within the visited network 104c. Upon awakening, the visiting subscriber 106 may request a new service. Once again, upon receipt of the request from the visiting subscriber 106, the service approval function 122a determines, based on parameters 120a, whether to approve the service requested by the visiting subscriber 106. Thus, in the embodiment of FIG. 1, the service approval function 120a is located at the base station 108a. In an alternative embodiment, the service approval function may be located at the centralized network node 116 of the operator 102c.

Figure 2:
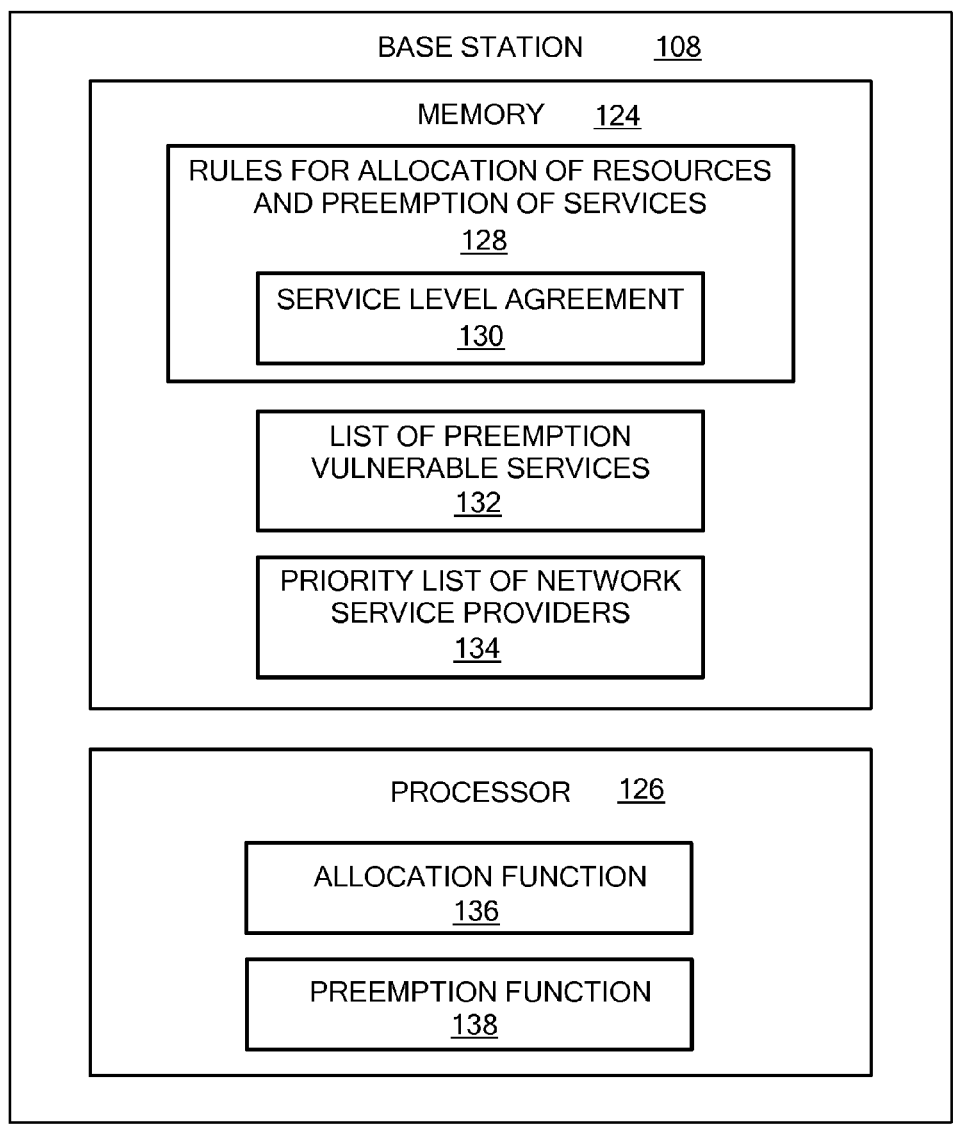
FIG. 2 is a block diagram of an exemplary network node constructed in accordance with principles of the present invention.

FIG. 2 shows a more detailed view of an exemplary base station 108 of the service provider 102c of the visited network 104c that may be employed to implement the service control functions described herein. The base station 108 has a memory 124 and a processor 126. The memory 124 stores rules 128 for allocation of resources and preemption of services. The rules may be based on one or more service level agreements (SLA) 130 between the vendor of the visited network and other vendors of other networks. The memory 124 may also store a list 132 of preemption-vulnerable services and a prioritized list 134 of network service providers.

The processor 126 includes an allocation function 136 and a preemption function 138. The combination of the allocation function 136 and the preemption function 138 form the approval function 122 of the base station 108 as shown in FIG. 1. Note that other components may be included in the base station 108 such as interfaces, displays, bus structures, etc. These components are not shown in FIG. 2 for ease of understanding the invention.

The rules 128 for allocation and preemption may cause the processor 126 to preempt at least one pre-existing service by identifying a preemption-vulnerable service being provided to at least one of a second set of subscribers associated with a vendor different from the vendor of a first subscriber requesting service. A rule may cause the processor 126 to preempt at least one pre-existing service by identifying a service provider associated with the second set of subscribers that has a lower priority than a service provider associated with the first subscriber. A rule may further cause the processor 126 to preempt at least one pre-existing service based at least in part on a determination that the second set of subscribers are receiving services that exceed a pre-determined allocation of resources to a service provider associated with the second set of subscribers. A rule may cause the processor 126 to preempt at least one pre-existing service based on a determination that the pre-existing service has a lower priority than a service requested by a first visiting subscriber. It will be understood that rules may apply to preempt or allocate service to additional sets, such as a third set of subscribers of a third vendor based on an SLA between the third vendor and the vendor of the visited network.

Table 1 below shows exemplary service level agreement (SLA) configurations to control services provided to a visiting subscriber 106 based on an SLA between the visiting subscriber's vendor (home service provider) 102a or 102b, and the service provider 102c of the visited network 104c. The data of Table 1 may be stored in the network node 116 of the operator 102c and/or may be stored in one or more of the base stations 108. In Table 1, the term "vendor" refers to the home service provider 104a or 104b of the visiting subscriber 106. Although Table 1 and the corresponding discussion herein is referenced to an SLA, it is understood that the parameters of Table 1 can be based solely on parameters established by the service provider 102c of the visited network 104c without regard to any actual agreement.

TABLE 1

| SLAI | Vendor's Priority | Direction | Vendor's ARP Priority | Vendor's ARP pre-emption capability (a list of QCIs with this capability) | Vendor's pre-emption vulnerability (a list of QCIs with this capability) |
|---|---|---|---|---|---|
| 1 | 1 (highest) | Uplink | 1 (highest) | {1, 2, 3, 4, 10, 12} | {5-9, 11, 13-255} |
|   | 1 (highest) | Downlink | 1 (highest) | {1, 2, 3, 4, 10, 12} | {5-9, 11, 13-255} |
| ... | ... | ... |   |   |   |
| y | 255 | Uplink | 15 | {1, 3} | {2, 4-255} |
|   | 255 | Downlink | 15 | {1, 3} | {2, 4-255} |

Note that an SLA indicator (column 1 of Table 1), which is an identifier associated with an SLA, can be configured with single values or with a range of values. The SLAI provides a way to associate a service level agreement between two service providers with an identifier that can easily be communicated to all nodes that use it. The actual SLA details may be signaled from a centralized node 116 to other distributed nodes 108. Note also that some services are bi-directional, utilizing both the uplink and the downlink. In such case, a service to be preempted may be preempted on both the uplink and the downlink, and a service to be admitted may be admitted on both the uplink and the downlink. The Quality of Service (QoS) Class Identifier (QCI) is a number that identifies a table of characteristics of one or more services. The entry of a QCI in the column entitled "Vendor's ARP preemption capability" indicates that the services associated with the QCIs may preempt other services. The entry of a QCI in the column entitled "Vendor's pre-emption vulnerability" indicates that the services associated with the QCIs may be preempted by other services.

The admission control procedures described herein may be utilized to allocate services and preempt services when enough resources do not exist to provide services to all subscribers in a radio access network including visiting subscribers. Suppose, for example, that a visiting subscriber (VS) A, whose home network is RAN A associated with vendor A, visits RAN C associated with a vendor C, so that RAN C is the visited network. Suppose further that all resources of RAN C allocated by an SLA to vendor A are exhausted and the new VS A roams into RAN C. The following method may be followed to free resources to be made available to provide service to VS A.

First, if the services for VS A are configured to be able to preempt other services, then RAN C can look for services that belong to vendor A that are configured as preemption-vulnerable in order to free resources for the new services to be afforded to VS A. Then, from a list of preemption-vulnerable services from vendor A, the services with the lowest allocation and retention priority (ARP) are terminated first in order to free resources to be afforded to VS A. Once sufficient resources are freed, the services requested by VS A are provided to VS A by the RAN C.

As another example, suppose the RAN C of vendor C is congested and VS A roams into RAN C and requests a service. The following steps may be followed to free resources for VS A. The vendor C will attempt to free preemption-vulnerable resources allocated to vendors other than vendor A that have exceeded their allocated resources. If this step does not provide enough resources to enable provision of the requested service to VS A, vendor C attempts to free resources from vendors with lower vendor priority than vendor A. The preemption-vulnerable services of the vendors with the lowest priority may be preempted to free resources.

As yet another example, when congestion is detected in RAN C of vendor C, one or more services may be preempted to avoid packet discards of higher priority services. First, vendors exceeding their allocated resources can have services preempted if such services are identified as preemption-vulnerable. Services with lower ARP may be preempted before services with higher ARP. If no vendors are exceeding their allocated resources, then vendor C attempts to free resources by preempting preemption-vulnerable services currently being utilized.

Figure 3:
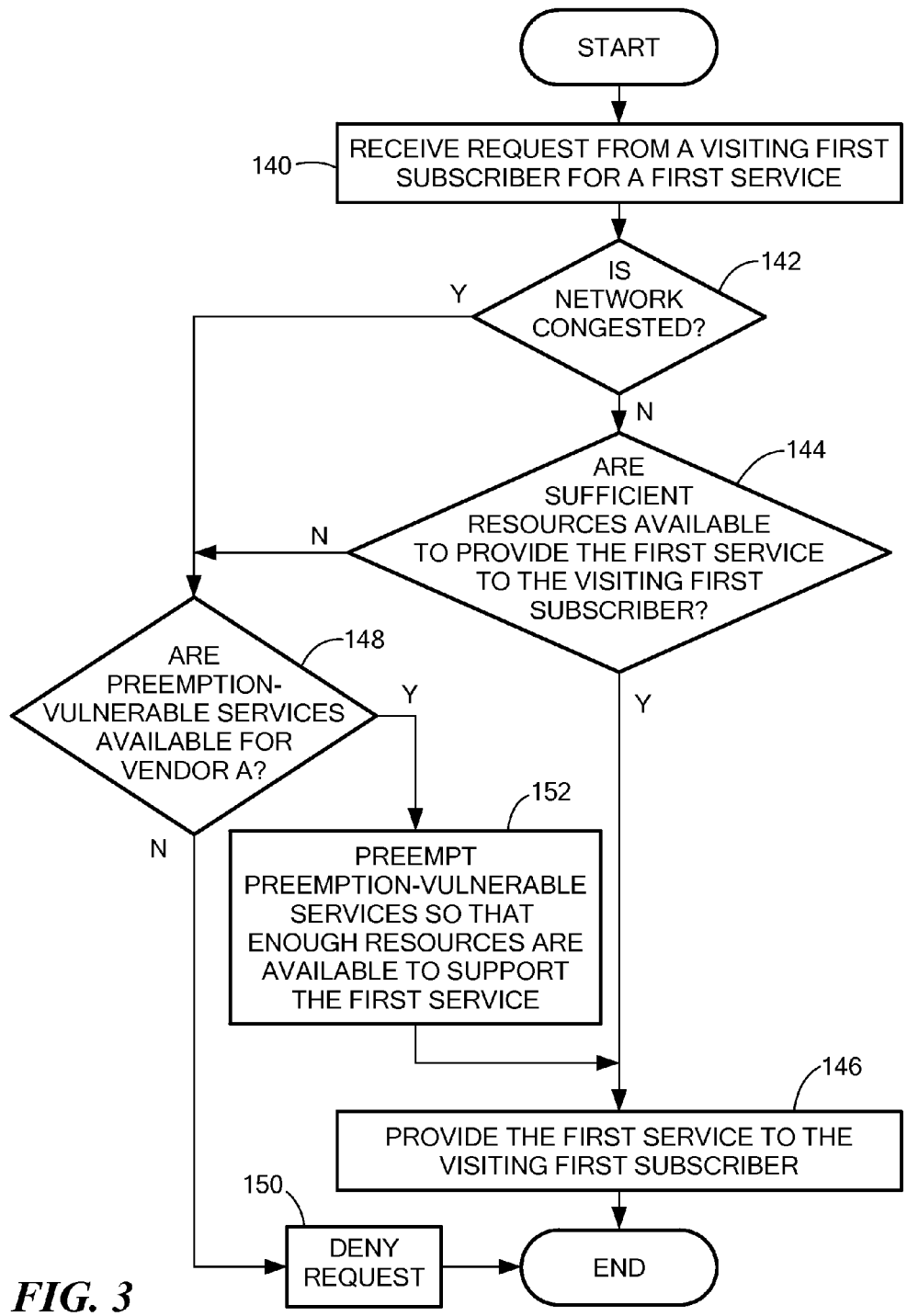
FIG. 3 is a flowchart of an exemplary process for allocation and preemption of services in accordance with principles of the present invention.

An exemplary process for allocation and preemption of services in accordance with principles of the present invention is described with reference to FIG. 3. A request is received in a network of a vendor C from a visiting first subscriber of a vendor A for a first service (step 140). A determination is made as to whether the visited network is congested (step 142). If the visited network is not congested, then a determination is made as to whether there are sufficient resources available to provide the first service to the visiting first subscriber (step 144). If there are sufficient resources available to provide the first service to the visiting first subscriber, then the first service is provided to the visiting first subscriber (step 146). If the network is congested or there are insufficient available resources to provide the requested service, then, if the requested service can pre-empt other services according to the SLAs, a determination is made as to whether there are preemption-vulnerable services allocated to vendor A (step 148). This determination may be based on terms of a service level agreement between the vendor A and the vendor C. If there are no preemption-vulnerable services allocated to vendor A, then the request for the service is denied (step 150). If there are preemption-vulnerable services allocated to vendor A, the preemption-vulnerable services are preempted so that there are enough free resources allocated to support the requested service (step 152). Then, the first service is provided to the visiting first subscriber (step 146).

Figure 4:
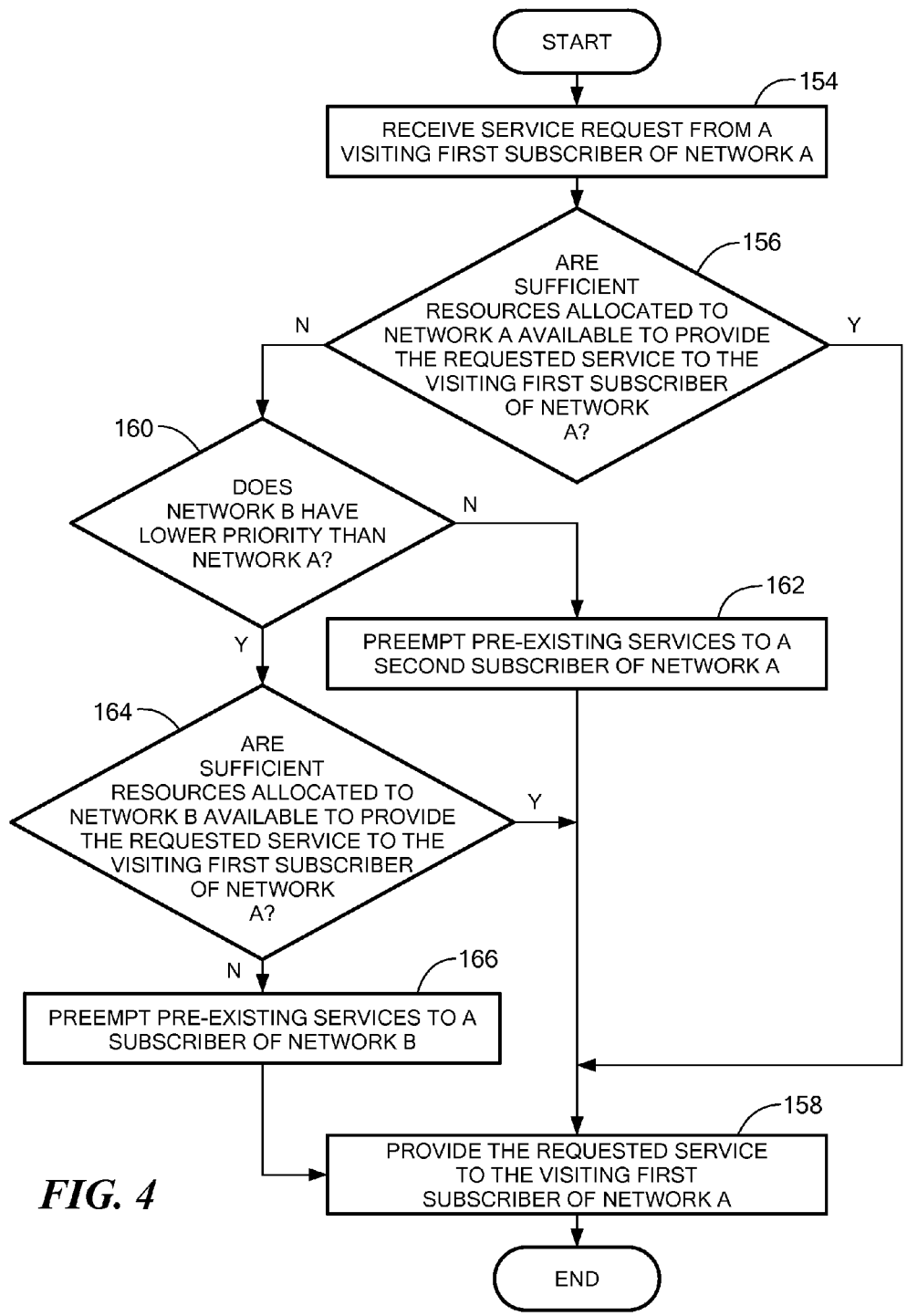
FIG. 4 is a flowchart of an exemplary process for allocation and preemption of services in accordance with principles of the present invention.

An exemplary process for allocation and preemption of services in accordance with principles of the present invention is described with reference to FIG. 4. In contrast to FIG. 3, which addresses the case of preempting service only of the same vendor as the home vendor of the visiting subscriber, FIG. 4 addresses the case where services of a third vendor B may be preempted as well.

A request is received by a vendor C from a subscriber of vendor A that has roamed into or awakens in the network C of vendor C (step 154). A determination is made whether there are sufficient resources allocated to subscribers of vendor A available to provide the requested service to the visiting subscriber (step 156). If there are sufficient resources allocated to vendor A available, then the requested service is provided to the visiting subscriber (step 158). If there are not sufficient resources allocated to vendor A available, then a determination is made whether another network B has lower priority than network A for the requested service (step 160). This determination may be based on terms of first SLA between provider B and provider C and a second SLA between provider A and provider C. If network B does not have a lower priority than network A, then a decision may be made, in some embodiments, to preempt a preemption-vulnerable service being provided to a second subscriber of vendor A (step 162). Upon preemption of the preemption-vulnerable service, the requested service is provided to the first visiting subscriber (step 158).

Returning to step 160, if network B has a lower priority than network A, then a determination is made whether there are sufficient resources allocated to network B available and allocable to vendor A to provide the requested service to the visiting subscriber (step 164). If there are sufficient resources allocated to network B available, then the requested service is provided to the visiting subscriber using the available resources of vendor B (step 158). If there are not sufficient resources allocated to network B available, preemption-vulnerable services provided to a subscriber of vendor B are preempted (step 166), and the freed resources are utilized to provide the requested service to the visiting first subscriber (step 158). SLAs between vendor B and the visited vendor C may include a minimum amount of resources reserved to be used exclusively for subscribers of vendor B, and such resources may not be used for subscribers of other vendors, such as subscribers of vendor A.

Advantages of the described embodiments include providing methods to enable a network operator to meet inter-carrier agreements, including Quality of Service (QoS) agreements. A mapping of vendors to terms of a service level agreement (SLA) can be stored at a centralized node and/or at each node that uses the SLA. For instance, the SLA terms may be stored at a centralized node of the network operator and signaled to the base stations of the network as needed. Each base station may or may not be free to override the terms of the SLA. Thus, embodiments provide a method for differentiating subscribers across multiple service providers by allowing or disallowing admission of user equipment (UE) into a network based on the SLA between service providers. Further, resources may be de-allocated in order to free resources when the network is congested to allow a new UE to be admitted or simply to reduce congestion.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of allocating services to a first subscriber of a first home service provider of a first home network when the first subscriber is visiting a network associated with a visited service provider, the method comprising:
   receiving, by a node of the visited network, a request from the visiting first subscriber to receive a first service from the visited network;
   determining, in response to the request, whether there are sufficient available resources of a first set of resources to provide the requested first service; and
   when the available resources of the first set of resources are insufficient to provide the requested first service, then:
   preempting at least one pre-existing service supported by a second set of resources so that sufficient resources from the second set of resources are made available to provide the requested first service to the first subscriber, the preempting being based at least in part on a determination that a set of visiting second subscribers associated with a second home service provider of a second home network different from the first home service provider of the first home network are receiving services that exceed the second set of resources; and
   providing the requested first service to the visiting first subscriber.

2. The method of claim 1, wherein the amount of resources in the first set of resources is based on at least one term of a service level agreement between the service provider of the visited network and the first home service provider of the visiting first subscriber, details of the service level agreement being communicated to the node of the visited network via a centralized node serving a plurality of nodes including the node of the visited network.

3. The method of claim 1, wherein the first set of resources are resources allocated to the first home service provider.

4. The method of claim 1, wherein the preempted pre-existing services are services that are designated to be preemption-vulnerable, a service being designated to be preemption-vulnerable via a signal from a centralized node serving a plurality of nodes including the node of the visited network.

5. The method of claim 1, further comprising preempting existing services supported by the first set of resources when the visited network is congested.

6. The method of claim 1, wherein the second set of resources are resources allocated to the second home service provider.

7. The method of claim 1, wherein the preempting is performed only if the second home service provider has a lower priority than the first home service provider.

8. A wireless communication network node, comprising:
   a memory, the memory configured to store rules for:
   allocating resources to subscribers; and
   preempting services to subscribers within the wireless communication network; and a processor, the processor configured to allocate a first service to a first one of a first set of subscribers associated with a first service provider of a first home network based on available resources and according to the stored rules, the allocation including preempting at least one pre-existing service supported by a second set of resources allocated to a second set of subscribers associated with a second service provider of a second home network different from the first home service provider of the first home network according to the stored rules so that enough resources are made available to provide the first service to the first one of the first set of subscribers, the stored rules for preempting services being based at least in part on determining whether the second set of subscribers are receiving services that exceed the second set of resources.

9. The node of claim 8, wherein the rules are based at least in part on a service level agreement, SLA, between a service provider of the wireless communication network and service provider of another wireless communication network, details of the SLA being communicated to the wireless communication node of via a centralized node serving a plurality of nodes including the wireless communication node.

10. The node of claim 8, wherein a rule for preempting at least one pre-existing service includes identifying a preemption-vulnerable service being provided to at least one of the second set of subscribers, a service being designated to be preemption-vulnerable via a signal from a centralized node serving a plurality of nodes including the wireless communication node.

11. The node of claim 8, wherein a rule for preempting at least one pre-existing service includes determining that the service provider associated with the second set of subscribers has a lower priority than a service provider associated with the first set of subscribers.

12. The node of claim 8, wherein a rule for preempting at least one pre-existing service is based on a determination that the pre-existing services have a lower priority than the first service.

13. The node of claim 8, wherein the preempting is performed only if the second service provider of the second home network has a lower priority than the first service provider of the first home network.

* * * * *